(12) United States Patent
Uchino et al.

(10) Patent No.: US 11,864,237 B2
(45) Date of Patent: Jan. 2, 2024

(54) USER EQUIPMENT

(71) Applicant: NTT DOCOMO, INC., Tokyo (JP)

(72) Inventors: Tooru Uchino, Tokyo (JP); Hideaki Takahashi, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 86 days.

(21) Appl. No.: 17/050,994

(22) PCT Filed: May 9, 2018

(86) PCT No.: PCT/JP2018/018009
§ 371 (c)(1),
(2) Date: Oct. 27, 2020

(87) PCT Pub. No.: WO2019/215859
PCT Pub. Date: Nov. 14, 2019

(65) Prior Publication Data
US 2021/0243809 A1 Aug. 5, 2021

(51) Int. Cl.
*H04W 74/08* (2009.01)

(52) U.S. Cl.
CPC .............................. *H04W 74/0833* (2013.01)

(58) Field of Classification Search
CPC .. H04W 74/0833; H04W 48/14; H04W 74/08
See application file for complete search history.

(56) References Cited

U.S. PATENT DOCUMENTS

| | | |
|---|---|---|
| 2010/0302998 A1 | 12/2010 | Bao et al. |
| 2018/0279377 A1* | 9/2018 | Lin ................ H04W 74/0833 |
| 2019/0028905 A1* | 1/2019 | Veeramallu ........... H04W 76/18 |
| 2019/0273582 A1* | 9/2019 | Yeo ....................... H04L 1/1887 |
| 2019/0350003 A1* | 11/2019 | Jang ................ H04W 74/0833 |
| 2021/0112590 A1* | 4/2021 | Kim .................... H04W 74/008 |

FOREIGN PATENT DOCUMENTS

| | | |
|---|---|---|
| EP | 3721660 A1 | 10/2020 |
| KR | 10-2010-0094539 A | 8/2010 |
| KR | 10-1506171 B1 | 3/2015 |
| WO | 2019139382 A1 | 7/2019 |

OTHER PUBLICATIONS

Samsung, "TA Timer Handling for Msg3 based SI Request", 3GPP, R2-1804305, Apr. 16-20, 2018 (Year: 2018).*

(Continued)

*Primary Examiner* — Derrick W Ferris
*Assistant Examiner* — Chuong M Nguyen
(74) *Attorney, Agent, or Firm* — Osha Bergman Watanabe & Burton LLP

(57) ABSTRACT

A terminal includes a receiver configured to receive a Timing Advance command; and a controller configured to control a timer related to uplink time alignment, wherein, in response to receiving the Timing Advance command by the receiver, the controller starts the timer, and wherein, upon receiving, by the receiver, a contention resolution message, the controller stops the timer after a time period from the reception of the contention resolution message.

3 Claims, 12 Drawing Sheets

(56) References Cited

OTHER PUBLICATIONS

Samsung "TA Timer Handling for Msg3 based SI Request", 3GPP, R2-1804305, Apr. 16-Apr. 20, 2018 (Year: 2018).*
International Search Report for corresponding International Application No. PCT/JP2018/018009, dated Jul. 24, 2018 (5 pages).
Written Opinion for corresponding International Application No. PCT/JP2018/018009, dated Jul. 24, 2018 (3 pages).
3GPP TS 38.321 V15.1.0; "3rd Generation Partnership Project; Technical Specification Group Radio Access Network; NR; Medium Access Control (MAC) protocol specification (Release 15)"; Mar. 2018 (67 pages).
Vivo; "Discussion on the RACH procedure for on-demand SI"; 3GPP TSG-RAN WG2 Meeting #101bis, R2-1804691; Sanya, China; Apr. 16-20, 2018 (7 pages).
Office Action in counterpart Indian Patent Application No. 202037046169 dated Dec. 3, 2021 (5 pages).
3GPP TSG RAN WG1 NR Ad-Hoc#2; R1-1711283 "PUCCH resource allocation for HARQ-ACK feedback to Msg4" Motorola Mobility, Lenovo; Qingdao, P.R. China; Jun. 27-30, 2017 (4 pages).
3GPP TSG-RAN2 101bis; R2-1804305 "TA Timer Handling for Msg3 based SI Request" Samsung; Sanya, China; Apr. 16-20, 2018 (3 pages).
Extended European Search Report issued in European Application No. 18918271.0, dated Mar. 22, 2022 (16 pages).
Office Action issued in counterpart Israeli Patent Application No. 277862 dated Mar. 15, 2023 (6 pages).

* cited by examiner

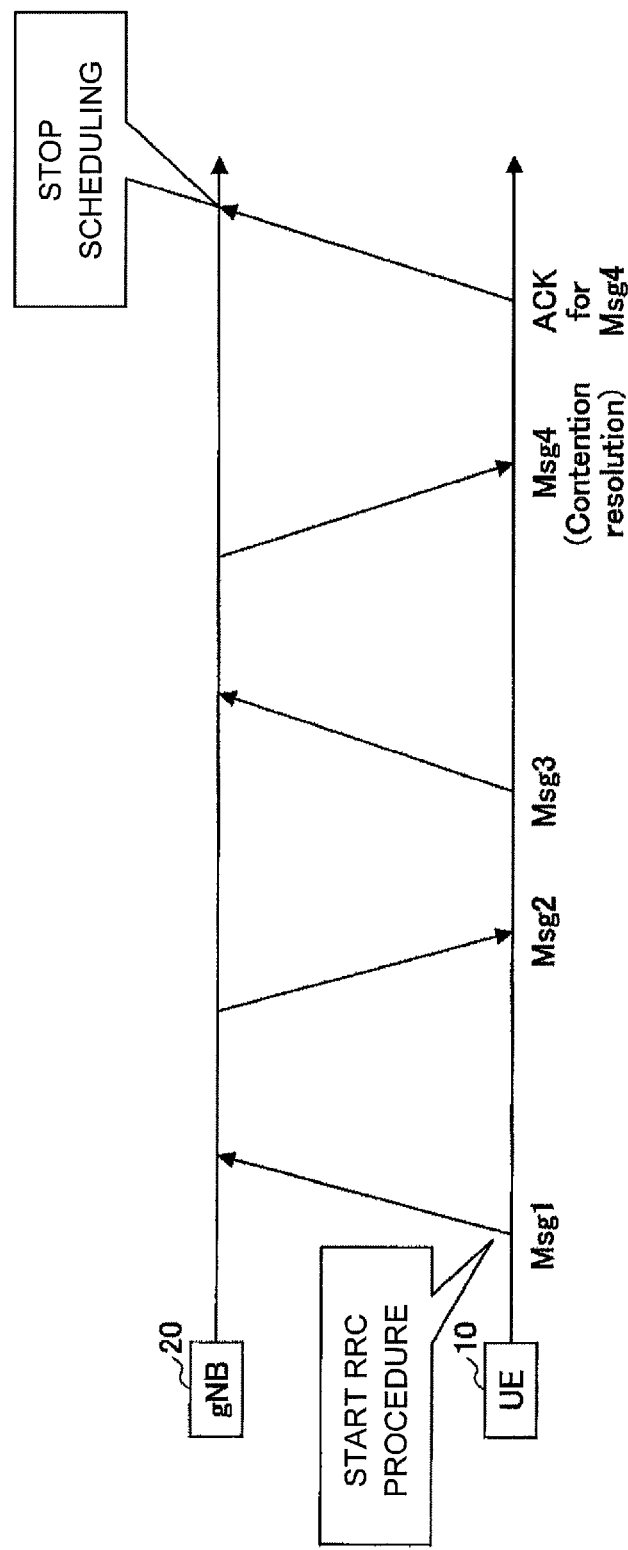

US 11,864,237 B2

USER EQUIPMENT

TECHNICAL FIELD

The present invention relates to user equipment of a wireless communication system.

BACKGROUND ART

In the 3GPP (3rd Generation Partnership Project), a wireless communication method called NR (New Radio) or 5G has been studied in order to further increase the capacity of the system, further increase the data transmission speed, and further reduce the latency in the wireless section (e.g., Non-Patent Document 1). For NR, various wireless technologies have been studied in order to meet the requirements of achieving throughput of 10 Gbps or more and reducing the latency of the wireless section to 1 ms or less.

In a cell, a propagation delay between user equipment and a base station, which is elapsed time for radio waves to propagate from the user equipment to the base station, is generally different for each unit of user equipment. Accordingly, the timing of receiving the UL signal at the base station generally differs for each unit of user equipment that transmits the UL signal. The base station performs a Fast Fourier Transform (FFT) at a same time for multiple UL signals from multiple units of user equipment. Accordingly, in the LTE, the timing of transmission of the UL signal is adjusted (time alignment) for each unit of user equipment so that the timing of reception of the multiple UL signals transmitted from multiple units of user equipment becomes the same at the base station. It is expected that the operation that is the same as the above-described operation is performed in NR.

PRIOR ART DOCUMENT

Non-Patent Document

Non-patent Document 1: 3GPP TS 38.321 V15.1.0 (2018-03)

Non-patent Document 2: 3GPP TSG-RAN WG2 Meeting #101bis, R2-1804691, Sanya, China, 16 Apr.-20 Apr. 2018

SUMMARY OF THE INVENTION

Problem to be Solved by the Invention

In LTE, a network always transmits SI regardless of whether user equipment requiring System Information (SI) is present in the cell. For NR, it has been studied to perform controlling to reduce an overhead of radio resources by transmitting SI only when the user equipment requiring the SI is in the cell (Non-Patent Document 1). Such system information is called on demand system information (on demand SI).

When acquiring system information on demand, user equipment transmits a SI request to a network and, in response to that, the network transmits the system information SI. As a method for transmitting an SI request, a method based on Message 1 of a random access procedure and a method based on Message 3 of a random access procedure have been specified. With regard to the method of acquiring system information based on Message 3 of the random access procedure, there is a need for a method with which user equipment can perform a random access procedure appropriately.

Means for Solving the Problem

According to an aspect of the present invention, there is provided user equipment including a transmitter that transmits a random access preamble to a base station; a receiver that receives a random access response transmitted from a base station; a controller that controls the user equipment; and a timer that operates in a time interval during which timing for transmitting an uplink signal from the user equipment is maintained, wherein, in response to receiving the random access response by the receiver, the controller activates the timer, and the controller causes the transmitter to transmit a message 3 including a message requesting transmission of system information to the base station, and wherein the controller stops the timer after a time period has elapsed from reception, by the receiver, of a contention resolution message transmitted from the base station.

Advantage of the Invention

According to the disclosed technique, a method is provided which is for acquiring system information based on Message 3 of a random access procedure with which user equipment can perform a random access procedure appropriately.

BRIEF DESCRIPTION OF DRAWINGS

FIG. 8A is a diagram illustrating an example of a Content Based Random Access (CBRA) procedure other than a random access procedure for performing an SI request.

EMBODIMENTS OF THE INVENTION

In the following, embodiments of the present invention (the embodiments) are described with reference to the drawings. Note that the embodiments described below are merely examples, and the embodiments to which the present invention is applied are not limited to the following embodiments.

Although the wireless communication system in the following embodiments is assumed to be basically conformed to NR, this is an example, and the radio communication system in the embodiments may conform, in part or in whole, to a wireless communication system other than NR (e.g., LTE).

(Overall Configuration of the System)

Figure 1:
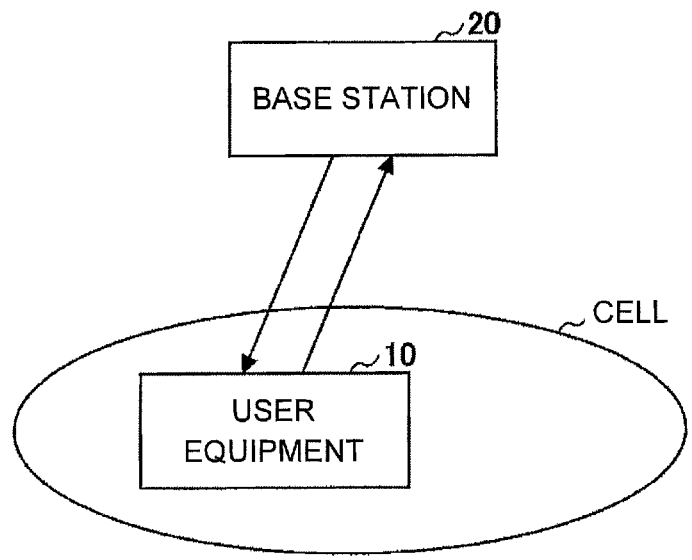
FIG. 1 is a diagram illustrating a configuration of a communication system according to an embodiment.

FIG. 1 is a configuration diagram of a radio communication system according to an embodiment. The radio communication system according to the embodiment includes user equipment 10 and a base station 20, as shown in FIG. 1. In FIG. 1, one unit of user equipment 10 and one base station 20 are shown. However, this is an example and there may be a plurality of units of user equipment 10 and a plurality of base stations 20.

The user equipment 10 is a communication device provided with a radio communication function, such as a smartphone, a cellular phone, a tablet, a wearable terminal, a communication module for Machine-to-Machine (M2M), etc., which wirelessly connects to base station 20 and utilizes various communication services provided by the radio communication system. The base station 20 is a communication device that provides one or more cells and wirelessly communicates with user equipment 10.

In the embodiments, a duplex method may be a TDD (Time Division Duplex) method or an FDD (Frequency Division Duplex) method.

(Random Access Procedure)

Figure 2:
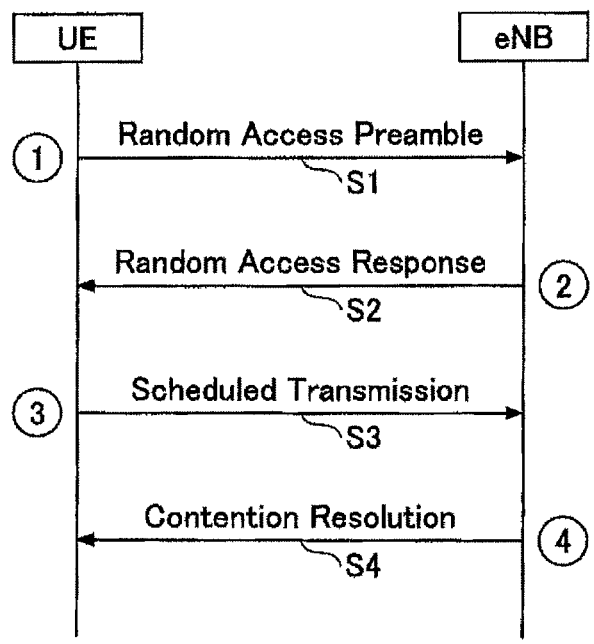
FIG. 2 is a diagram illustrating an example of a random access procedure.

First, a basic process of a contention-based random access procedure in an LTE is described by referring to FIG. 2. It is assumed that a procedure similar to this procedure is performed in NR.

The user equipment transmits, on a PRACH (Physical Random Access Channel), a RA preamble (selected sequence, Message 1) using one sequence among a predetermined number of RA preambles (sequences) (step 1). No contention occurs, provided that there is no other UE that performs random access using the same sequence at the same time.

At step S2, the base station uses the DL-SCH (Downstream Shared Channel) to transmit Random Access Response (RAR) to the user equipment including a TA (timing advance) command for adjusting transmission timing of the user equipment, a detected RA preamble index, uplink resource allocation information (UL grant), etc.

The user equipment that receives the RAR adjusts uplink timing and transmits a control message (Message 3), such as an RRC connection request, to the base station using the allocated resources (step S3).

If the user equipment that transmits the RA sample fails to receive an RA response (when a random access attempt fails), the user equipment increases the transmit power by a predetermined step size and transmits the PRACH each time a failure occurs. Such an operation is called Power Ramping.

At step S4, the base station transmits a contention resolution message (a contention resolution message). The user equipment that receives the content solution message completes the random access procedure by verifying that the content solution message includes the user equipment's ID (e.g., the Common Control Channel Service Data Unit (CCCH SDU) or the TC-RNTI, which was used for scrambling in step S3), and, subsequently, the user equipment performs transmission and reception of the data.

As described above, at step S2 of the random access procedure, the base station transmits a RAR including the TA command to the user equipment. The reasons are as follows.

Figure 3:
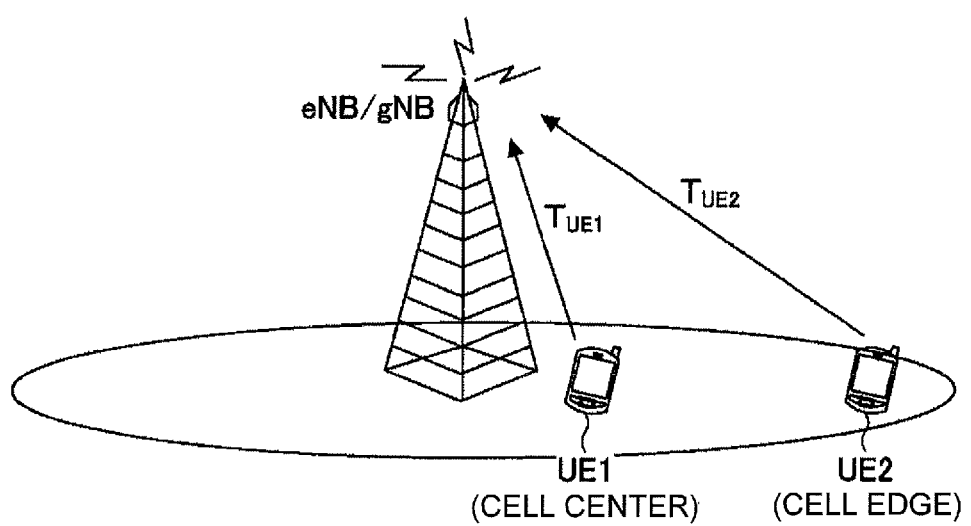
FIG. 3 is a diagram illustrating an example of propagation delay between user equipment and base station, which is an elapsed time for a radio wave to propagate from user equipment to a base station, in a cell.

As illustrated in FIG. 3, a propagation delay between user equipment and a base station, which is time elapses for radio waves to propagate from user equipment to a base station in a cell, generally differs for units of user equipment. Accordingly, timing for receiving a UL signal at the base station generally generally differs for each unit of user equipment that transmits the UL signal. The base station performs a Fast Fourier Transform (FFT) at a same time for multiple UL signals from multiple units of user equipment. Accordingly, in the LTE, transmission timing of a UL signal is adjusted (time alignment) for each unit of user equipment, so that reception timing of multiple UL signals transmitted from multiple units of user equipment is the same at the base station. Time alignment is performed by a TA command transmitted from the base station to the user equipment. That is, the user equipment adjusts the transmission timing of the UL signal based on the TA command received from the base station. Such time alignment is assumed to be followed by NR.

(Overview of SI request)

System information (System Information, SI) is divided into a MasterInformation Block (MIB) and several System Information Blocks (SIB). A MasterInformation Block (MIB) is always transmitted on a Broadcast Channel (BCH) with a periodicity of 80 ms, and the Master Information Block includes a parameter required to get SystemInformationBlockType 1 (SIB1) from the cell.

A SystemInformationBlockType1 (SIB1) includes information about the availability and scheduling of multiple other SIBs (e.g., periodicity, SI window size). The SIB1 also indicates whether the multiple other SIBs are transmitted based on periodic broadcasts or only on-demand.

A SIB other than SIB1 is transmitted in a SystemInformation (SI) message transmitted on a DL-SCH. Each SI message is transmitted in multiple windows (called SI windows) in a time-domain, which are periodically generated.

A MIB includes basic information, such as a system bandwidth, a system frame number (SFN: System Frame Number), and a number of transmitting antennas.

In LTE, a network always transmits SI, regardless of whether user equipment requiring SI exists in a cell. For NR, it has been studied to perform control for reducing overhead of radio resources by transmitting SI only if there exists user equipment requiring the SI in a cell (Non-Patent Document 1). Such system information is called on demand system information (on demand SI).

For acquiring system information on demand, user equipment 10 transmits an SI request to a network and the network transmits the system information SI in response thereto.

As a method for transmitting an SI request, a method based on Message 1 of a random access procedure and a method based on Message 3 of a random access procedure are specified.

(Overview of the Method Based on Message 1)

A method of transmitting an SI request based on Message 1 of a random access procedure is described below. The base station 20 (also called gNB, gNodeB, 5G base station, NR base station, etc.) allocates individual RA preambles for respective SIs in advance, and the user equipment 10 acquires necessary SI by transmitting an SI request using a corresponding RA preamble. A specific procedure is described by referring to FIG. 4.

Figure 4:
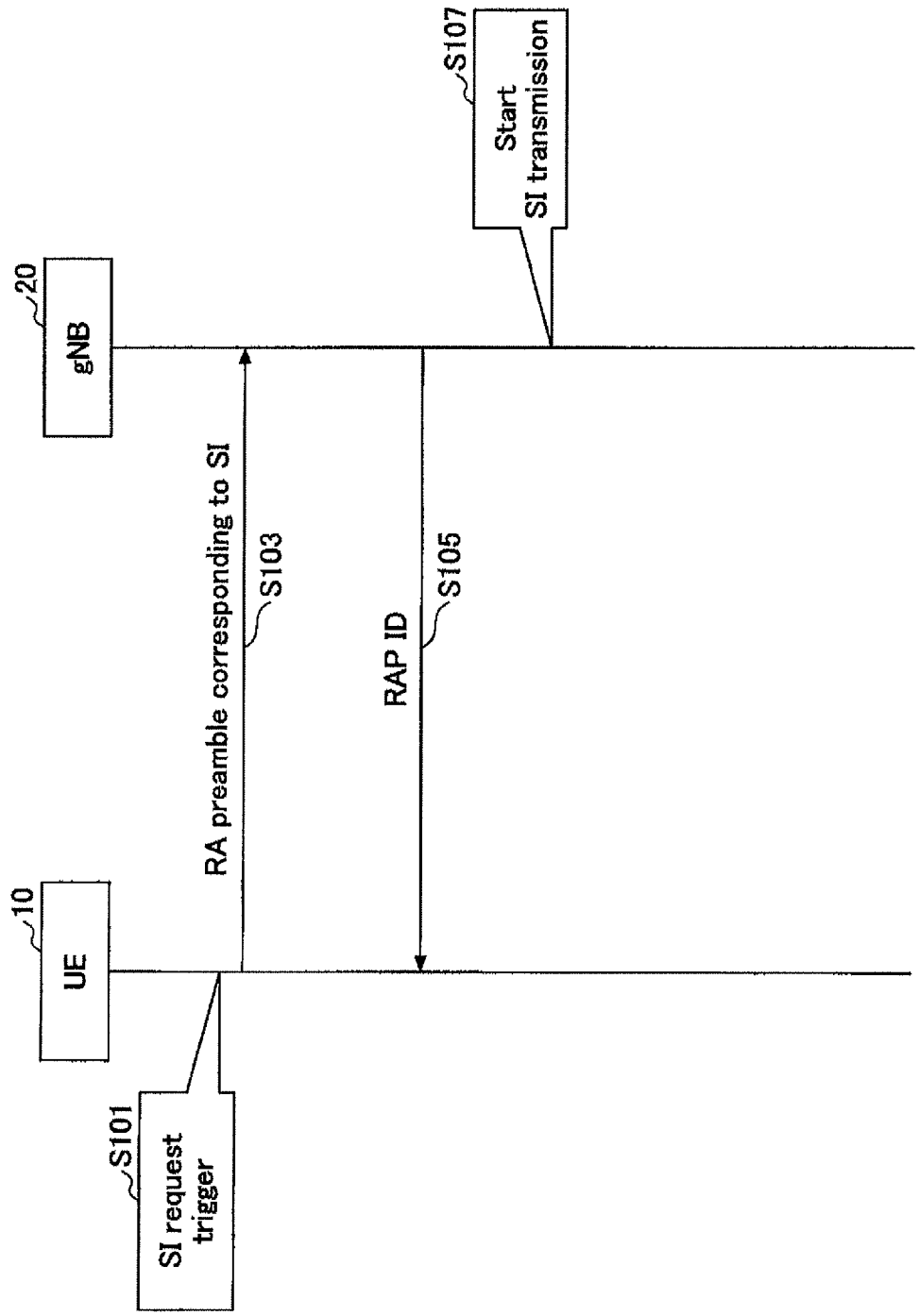
FIG. 4 is a diagram illustrating an example of a method of transmitting an SI request based on a message 1 of a random access procedure.

FIG. 4 is a diagram illustrating an example of a method of transmitting an SI request based on Message 1 of a random access procedure. First, at step S101, an event (SI request trigger) that requires transmission of an SI request occurs in the user equipment 10.

In response to occurrence of the SI request trigger at step S101, the user equipment 10 selects an RA preamble corresponding to the SI at step S103 and the user equipment 10 transmits the selected RA preamble to the base station 20.

In response to receiving the RA preamble corresponding to the SI, the base station 20 returns an RA preamble ID corresponding to the received RA preamble to the user equipment 10 at step S105.

Subsequently, the base station 20 starts transmitting the SI (step S107).

(Overview of the Method Based on Message 3)

Next, the method of transmitting the SI request based on Message 3 of the random access procedure is described. This method can be applied to a case in which no RA preamble for an SI request is configured, and the method is such that an RRC message for an SI request is transmitted by Message 3 of a random access procedure while activating the random access procedure. A specific procedure is described by referring to FIG. 5.

Figure 5:
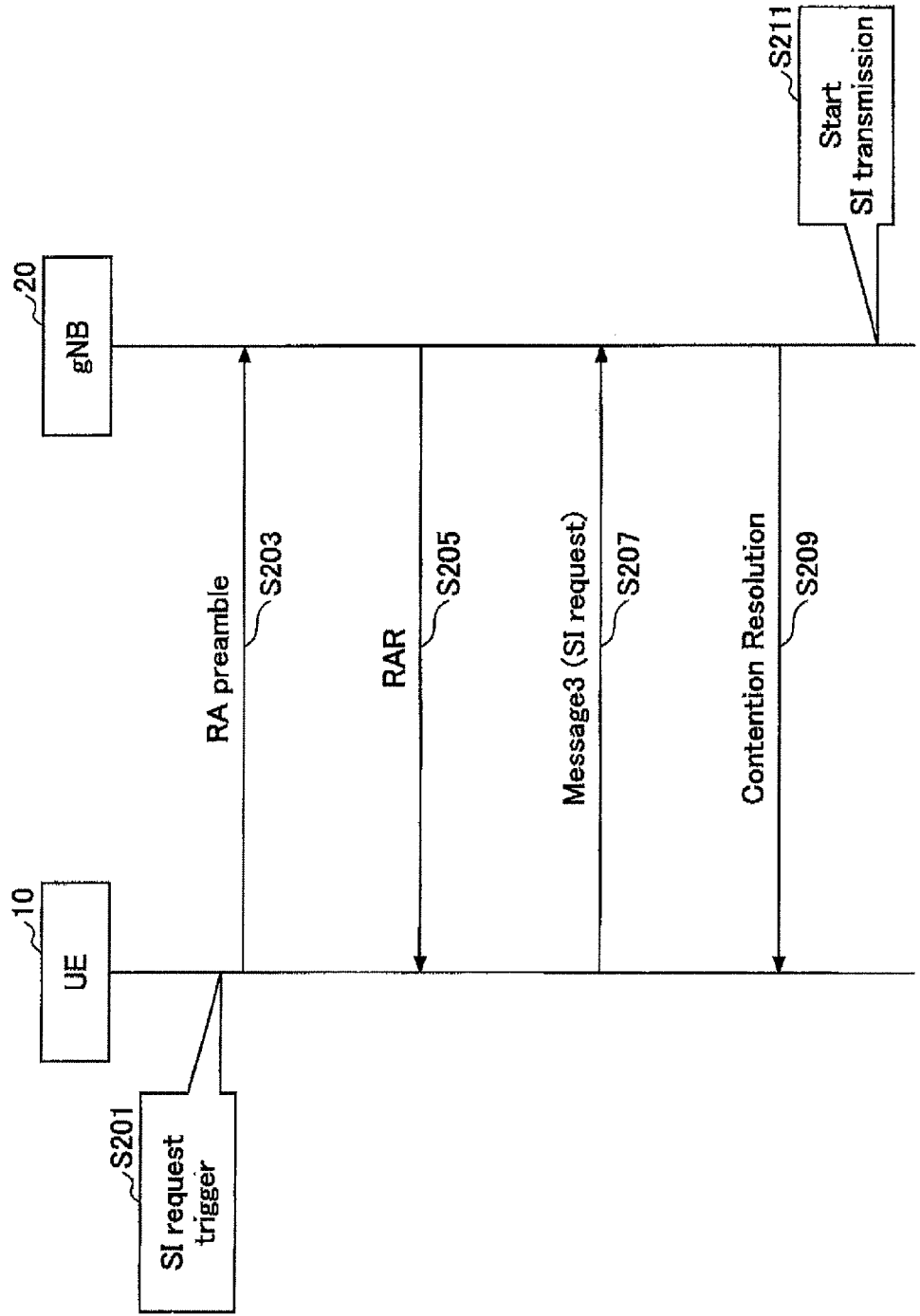
FIG. 5 is a diagram illustrating an example of a method of transmitting an SI request based on a message 3 of a random access procedure.

FIG. 5 is a diagram illustrating an example of a method of transmitting a SI request based on Message 3 of a random access procedure. First, at step S201, an event (SI request trigger) that requires transmission of an SI request occurs in the user equipment 10.

In response to occurrence of the SI request trigger at step S201, the user equipment 10 transmits an RA preamble at step S203.

In response to receiving the RA preamble from the user equipment 10, the base station 20 transmits a Random Access Response (RAR) to the user equipment 10 at step S205.

In response to receiving the RAR from the base station 20, the user equipment 10 transmits Message 3 including an SI request to the base station 20 at step S207.

In response to receiving Message 3 from the user equipment 10, the base station 20 transmits a contention resolution message (contention resolution message) to the user equipment 10 at step S209.

Subsequently, the base station 20 starts transmitting the SI (step S211). In the following, details of the method of transmitting the SI request based on the above-described Message 3 are described.

(Outline of TA Timer)

In each of the user equipment 10 and the base station 20, for example, a Radio Resource Control (RRC) layer sets a TA timer (timeAlignment Timer) to maintain uplink time adjustment. The TA timer is used to control a length of time during which a Medium Access Control (MAC) entity maintains the Time Alignment of an uplink.

Here, a timer is running once it is started, until it is stopped or until it expires; otherwise it is not running. If a timer is not running, the timer can be started. If a timer is running, the timer can be restarted. A timer is always started or restarted from an initial value of the timer (Non-Patent Document 1). In each of the user equipment 10 and the base station apparatus 20, a timer may be implemented in a known method, such as, for example, a processor counting up a counter from an initial value or counting down from an initial value. However, a method of implementing a timer is not specified in this specification.

Usually, when a TA timer of the user equipment 10 is not running and the user equipment 10 receives a TA command in a random access procedure, the user equipment 10 starts or restarts the TA timer. Subsequently, the user equipment 10 does not autonomously stop the TA timer. Namely, the TA timer of the user equipment 10 stops by expiry.

In this regard, as an agreement in the 3GPP standardization, upon completion of a random access procedure for a Message3 based SI request, the user equipment 10 can autonomously stop the TA timer (Non-Patent Document 2).

Figure 6:
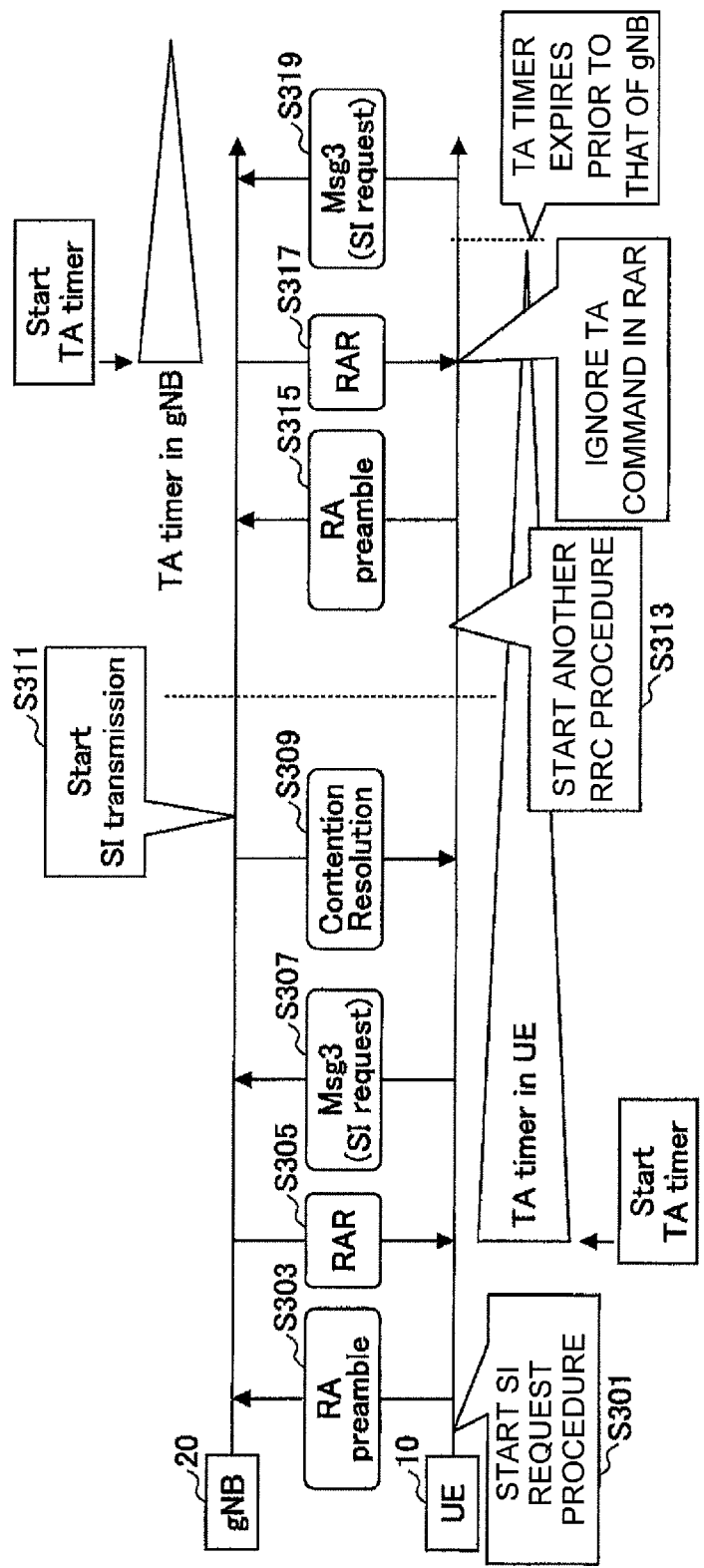
FIG. 6 is a diagram illustrating an example in which user equipment does not autonomously stop a TA timer when a random access procedure for performing a Message 3-based SI request is completed.
Figure 7:
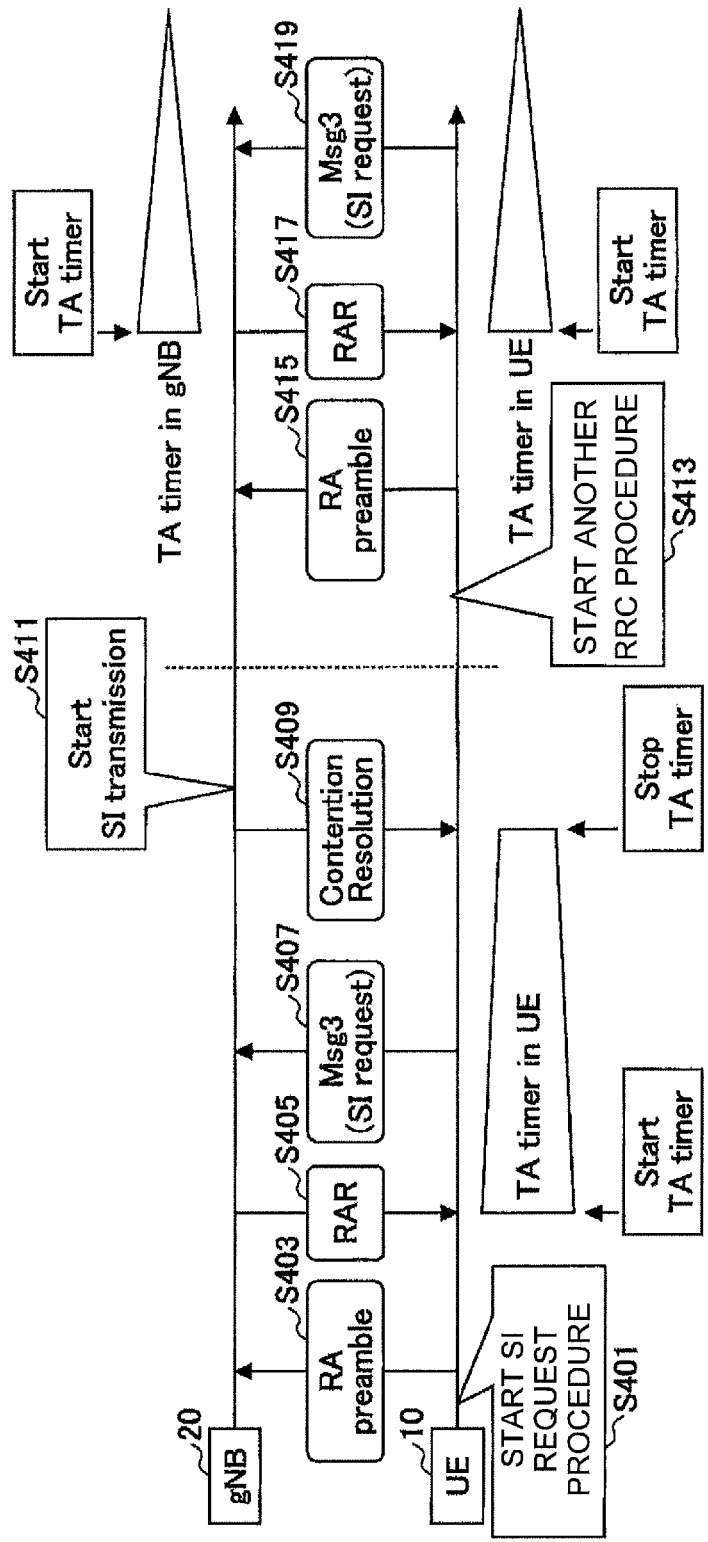
FIG. 7 is a diagram illustrating an example in which user equipment autonomously stops a TA timer when a random access procedure for performing a Message 3-based SI request is completed.

Referring to FIGS. 6 and 7, a case in which the user equipment 10 does not autonomously stop the TA timer and a case in which the user equipment 10 autonomously stops the TA timer are described, respectively.

FIG. 6 illustrates an example in which the user equipment 10 does not autonomously stop the TA timer. As shown in FIG. 6, at step S301, the user equipment 10 starts a random access procedure for the Message3 based SI request. The user equipment 10 transmits a random access preamble to the base station 20 in step S303. In response to receiving a random access preamble, the base station 20 transmits a random access response (Random Access Response, RAR) to the user equipment 10 at step S305. At this time, the user equipment 10 starts the TA timer in response to receiving the TA command included in the random access response.

Subsequently, in response to receiving a random access response at step S305, the user equipment 10 transmits Message 3 including an SI request to the base station 20 at step S307.

In response to receiving a message 3 including SI request in step S307, the base station 20 transmits a content solution message (contention resolution message) to the user equipment 10 at step S309. Subsequently, at step S311, the base station 20 starts transmitting system information.

Next, at step S313, the user equipment 10 starts another RRC procedure. As a reason for starting another RRC procedure, for example, the following cases can be considered: a case in which synchronization with the base station 20 is to be established again; a case in which an RRC connection with the base station is to be resumed, etc.

At step S315, the user equipment 10 transmits a random access preamble to the base station 20. In response to receiving a random access preamble at step S315, the base station 20 transmits the RAR to the user equipment 10 at step S317. In this case, the user equipment 10 has already started the TA timer at step S305 and the TA timer is running. As described in Non-Patent Document 1, the 3GPP standard specifies that when a TA command is received while a TA timer is running in a contention-based random access procedure, the MAC entity of the user equipment 10 ignores the TA command. Accordingly, the user equipment 10 ignores the TA command received at step S317. Namely, even if the TA command is received at step S317, the user equipment 10 does not start or restart the TA timer, and the TA timer continues running. In this case, in response to receiving the RAR at step S317, the user equipment 10 attempts to transmit Message 3. However, prior to sending message 3, a TA timer may expire. Alternatively, even if the expiration of the TA timer is after transmission of Message 3 by the user equipment 10 at step S319, at the base station 20 activates the TA timer at a timing at which the RAR is transmitted at step S317, so that the TA timer of the user equipment 10 may expire prior to expiration of the TA timer of the base station 20. Namely, the activation state of the TA timer of the user equipment 10 and the activation state of the TA timer of the base station 20 may not match.

In order to avoid inconsistencies in the activation states of the above-described TA timers, in the standardization of 3GPP, an agreement has been reached such that, when the RA procedure for Message 3 based SI request is completed, user equipment autonomously stops a TA timer (Non-Patent 2).

FIG. 7 illustrates an example in which the user equipment 10 autonomously stops the TA timer when the RA procedure for the Message 3-based SI request is completed.

As shown in FIG. 7, at step S401, the user equipment 10 starts a random access procedure for a Message3 based SI request. The user equipment 10 transmits a random access preamble to the base station 20 at step S403. In response to receiving a random access preamble, the base station 20 transmits a random access response (Random Access Response, RAR) to the user equipment 10 at step S405. At this time, the user equipment 10 starts the TA timer in response to receiving the TA command included in the random access response.

In response to receiving a random access response at step S405, the user equipment 10 transmits Message3 including SI request to the base station 20 at step S407.

In response to receiving Message 3 including SI request at step S407, the base station 20 transmits a content solution message (contention resolution message) to the user equipment 10 at step S409. Here, the user equipment 10 stops the TA timer in response to receiving the content solution message at step S409. Subsequently, at step S411, the base station 20 starts transmitting system information.

Next, at step S413, the user equipment 10 starts another RRC procedure. As a reason for starting another RRC procedure, for example, cases can be considered, such as a case in which resynchronization with a base station is to be established and a case in which an RRC connection with a base station is to be resumed.

At step S415, the user equipment 10 transmits a random access preamble to the base station 20. In response to receiving a random access preamble at step S415, the base station 20 transmits an RAR to the user equipment 10 and starts the TA timer of the base station 20 at step S417. The user equipment 10 starts the TA timer of the user equipment 10 in response to receiving a TA command included in the random access response received at step S417. Subsequently, at step S419, the user equipment 10 transmits Message 3 including an SI request to the base station 20.

As described above, since the base station 20 starts the TA timer of the base station 20 at step S417 and the user equipment 10 that receives the TA command at step S417 starts the TA timer of the user equipment 10, inconsistency between the running state of the TA timer of the user equipment 10 and the running state of the TA timer of the base station 20 can be avoided, such as a case in which the TA timer of the user equipment 10 expires prior to expiration of the TA timer of the base station 20.

However, there is a problem described below with the method in which the user equipment 10 autonomously stops the TA timer upon completion of the above-described RA procedure for the Message 3 based SI request.

While the TA timer is stopped, uplink transmission timing of the user equipment 10 is not established. For this reason, according to the 3GPP standard, the user equipment 10 is disallowed to transmit an uplink signal except for transmitting a random access preamble on a Physical Random Access Channel (PRACH) (Non-Patent Document 1). Accordingly, as described above, upon completion of the contention resolution, i.e., upon receipt of the contention resolution message at step S409 of FIG. 7, if the TA timer of the user equipment 10 is immediately stopped, the user equipment 10 is unable to transmit the acknowledgment information (Acknowledgement, ACK, or NAK) for the contention resolution message. As a result, the base station 20 is unable to detect that the user equipment 10 has received the content solution message. In this regard, for example, the base station 20 can increase a probability of receiving, by the user equipment 10, a contention resolution message by a method of blindly transmitting a contention resolution message multiple times. However, in this case, radio resources are wasted.

Figure 8B:
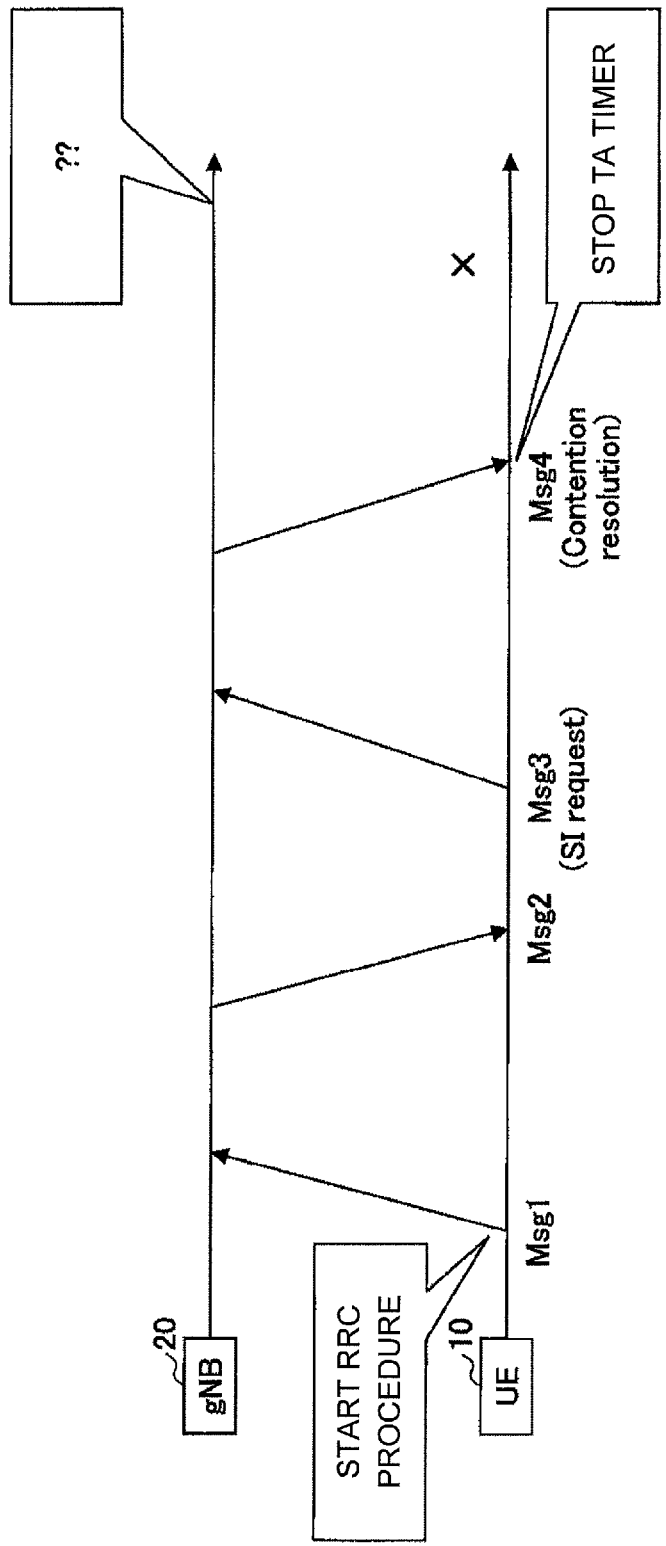
FIG. 8B is a diagram illustrating an example of a CBRA procedure for performing an SI request.

FIGS. 8A and 8B are diagrams illustrating the above-described problem. As shown in FIG. 8A, according to a competition-based random access (Content Based Random Access, CBRA) procedure other than a random access procedure for an SI request, the user equipment 10 is able to transmit the acknowledgement information of Message4 to the base station 20 because the TA timer is not stopped prior to transmitting the acknowledgement information of Message4 (content resolution message).

In contrast, for a CBRA for an SI request illustrated in FIG. 8B, when Message4 is received, the user equipment 10 stops the TA timer of the user equipment, so that the user equipment 10 is unable to transmit the acknowledgement information of Message4, and the base station 20 is unable to confirm whether Message 4 has been received by the user equipment 10.

(Method 1)

As a method for solving the above-described problem, a method can be considered such that, in a CBRA for an SI request, the TA timer is kept running until completion of transmission of the acknowledgement information by the UE. Namely, the user equipment 10 stops the TA timer of the user equipment 10 after the user equipment 10 completes the transmission of the acknowledgement information to the message 4 (content solution message). In the following, details of this method are described by referring to FIG. 9.

Figure 9:
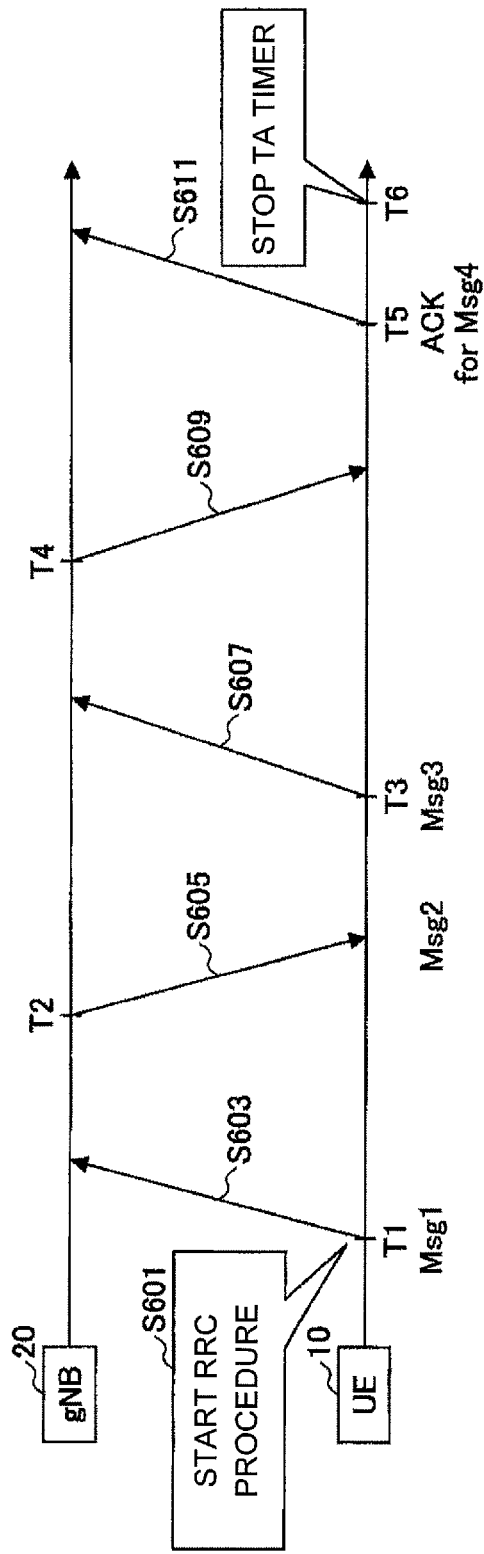
FIG. 9 is a diagram illustrating an example of a method in which user equipment stops a TA timer after completing transmission of delivery confirmation information.

FIG. 9 is a diagram illustrating an example of a method in which user equipment stops the TA timer after completing transmission of the acknowledgement information. At step S601, the user equipment 10 starts a CBRA for an SI request. At time T1, the user equipment 10 transmits Message1 (RA preamble) to the base station 20 (at step S603). In response to receiving message 1, the base station 20 transmits Message2 (RAR) to the user equipment 10 at time T2 (step S605). In response to receiving message 2, the user equipment 10 transmits Message3 (SI request) to the base station 20 at time T3 (step S607). In response to receiving Message3, the base station 20 transmits Message4 (content solution message) to the user equipment 10 at time 14 (step S609). In response to receiving Message 4, the user equipment 10 completes transmission of the acknowledgement information for Message4 to the base station 20 at time T5 (Step S611). Subsequently, the user equipment 10 stops the TA timer at time T6 after time T5, which is the time at which transmission of the acknowledgement information to the base station 20 is completed.

That is, the method is such that the user equipment 10 delays the stop of the TA timer of the user equipment 10 upon completion of the CBRA for the SI request.

Here, the user equipment 10 may stop the TA timer of the user equipment 10 at a timing at which the acknowledgement information is transmitted. Alternatively, the user equipment 10 may stop the TA timer of the user equipment 10 in a radio frame immediately after the radio frame at the timing at which the acknowledgement information is transmitted. Alternatively, the user equipment 10 may stop the TA timer of the user equipment at a sub-frame immediately after the sub-frame at a timing at which the acknowledgement information is transmitted. Alternatively, the user equipment 10 may stop the TA timer of the user equipment at a slot immediately after the slot at which the acknowledgement information is transmitted. Alternatively, the user equipment 10 may stop the TA timer of the user equipment at a symbol immediately after the symbol at a timing at which the acknowledgement information is transmitted.

In addition, the user equipment 10 may stop the TA timer after a time period after a successful contention resolution, i.e., a successful CBRA. Here, a time period may be managed at any layer of the user equipment 10, such as the Medium Access Control (MAC) layer of the user equipment 10 or the Radio Resource Control (RRC) layer of the user equipment 10. Alternatively and/or additionally, a time period may be managed at any layer of base station apparatus 20, such as a Medium Access Control (MAC) layer of base station apparatus 20 or a Radio Resource Control (RRC) layer of base station apparatus 20.

When a time period is managed by the MAC layer, the MAC layer may autonomously stop the TA timer of the user equipment 10 upon expiration of the TA timer. Alternatively, the MAC layer may inform the upper layer (e.g., the RRC layer) that a time period has elapsed (expiration of the TA timer), and the MAC layer may then be indicated from the upper layer to stop the TA timer of the user equipment 10. For example, the MAC layer may stop the TA timer of the user equipment 10 by receiving a MAC reset from the RRC layer.

When a time period is managed by the RRC layer, the RRC layer may report or indicate, to the MAC layer, stop of the TA timer of the user equipment 10 (e.g., MAC reset).

Furthermore, when a time period is managed by the RRC layer, the RRC layer may modify setting of whether the TA timer of the user equipment 10 is to be stopped or not stopped or an amount of delay of the timing for the user equipment 10 to stop the TA timer depending on an RRC state of the user equipment 10 (e.g., a RRC CONNECTED state, an RRC IDLE state, or an RRC INACTIVE state). Here, in the RRC IDLE state, the user equipment 10 does not have a cell-level identification in the base station 20 and does not retain the context of the user equipment 10 in the base station 20. The context of the user equipment 10 retained in the core network. In the RRC INACTIVE state, the user equipment 10, the base station 20, and the network retain the context of the RRC and the NAS (Non Access Stratum). However the state of the user equipment 10 is almost the same as that of the RRC IDLE, so that power consumption is expected to be reduced. In the RRC CONNECTED state, the user equipment 10 is identifiable at the cell level within the base station 20 and retains the context of the user equipment 10 at the base station 20. When a time period is managed by the RRC layer, the RRC layer may modify setting of whether the TA timer of the user equipment 10 is stopped, or modify an amount of delay at which the TA timer of the user equipment 10 is stopped, depending on the type of random access procedure (e.g., random access procedure for the CCCH SDU, any other random access procedure).

For example, if the state of the user equipment 10 is in the RRC IDLE state or the RRC INACTIVE state, the RRC layer may stop the TA timer of the user equipment 10 after a time period from the success of the CBRA. If the state of the user equipment 10 is RRC CONNECTED, the RRC layer may not stop the TA timer of the user equipment 10 (which may be considered as a time period=infinity). However, even if the status of the user equipment 10 is in the RRC IDLE state or the RC INACTIVE state, the RRC layer may not stop the TA timer of the user equipment 10 if the status of the user equipment 10 may become the RRC CONNECTED subsequently (e.g., when SI request and RC connection (or request) request are executed simultaneously).

The time period may be the time interval between the receipt of a PDCCH or PDSCH including a content solution message and the transmission of the corresponding acknowledgement information. For example, a time period may be 4 ms, as in the case of an LTE. Alternatively, a time period may be the time from the receipt of a PDCCH or PDSCH including a content solution message to the transmission timing of the acknowledgement information notified by the slot length, Downlink Control Information (DCI), or the RRC layer. Alternatively, the time may be the maximum (e.g., 8 ms) or minimum value of time from the receipt of a PDCCH or PDSCH including a content solution message to the timing of transmission of the acknowledgement information assumed in the specification or a configuration.

Furthermore, when a Repetition is applied to the PDCCH, PDSCH, or acknowledgement information, a time period may be from the first transmission timing (or the first reception timing at the user equipment 10) from the base station 20 of the PDCCH or PDSCH to the last ACK transmission timing by the user equipment 10.

The time period may also be a configured value of the content solution timer. Alternatively, the time period may be the minimum value of the configured range of the content solution timer or the maximum value of the configured range of the content solution timer.

The time period may also be the pending period at a time of the RRC connection release.

In addition, an offset value (e.g., equivalent to a processing delay time) may be added to each of the above-described time periods.

(Method 2)

As an alternative method for solving the above-described problem, even if a CBRA for an SI request is completed, the user equipment 10 does not autonomously stop the TA timer of the user equipment 10, and the user equipment 10 may stop the TA timer of the user equipment 10 at a timing of starting a next random access procedure. In the following, details of this method are described by referring to FIG. 10.

Figure 10:
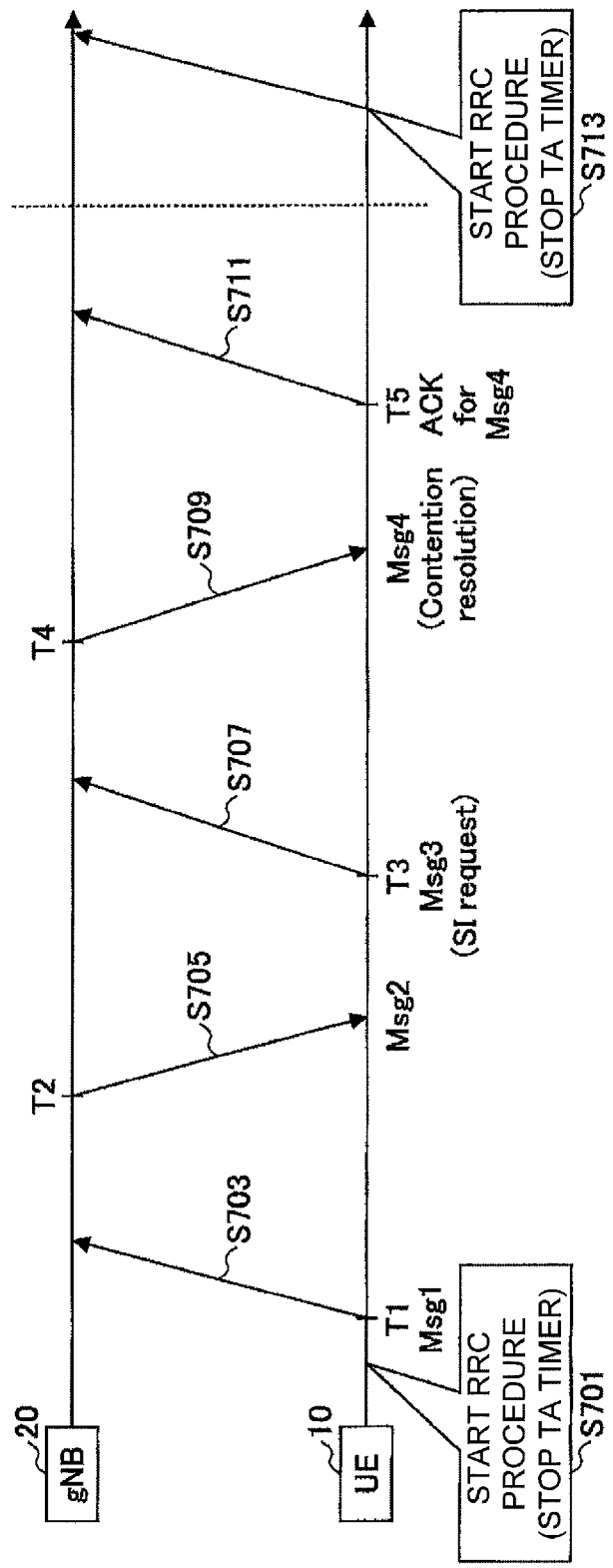
FIG. 10 is a diagram illustrating an example of a method in which user equipment stops a TA timer at a start of a subsequent random access procedure.

FIG. 10 is a diagram illustrating an example of a method in which a user equipment stops a TA timer at a start of a next random access procedure. At step S701, the user equipment 10 starts a CBRA for an SI request. At time T1, the user equipment 10 transmits Message1 (RA preamble) to the base station 20 (step S703). In response to receiving Message 1, the base station 20 transmits Message2 (RAR) to the user equipment 10 at time T2 (Step S705). In response to receiving Message2, the user equipment 10 transmits Message3 (SI request) to the base station 20 at time T3 (Step S707). In response to receiving Message 3, the base station 20 transmits Message 4 (content solution message) to the user equipment 10 at time 14 (step S709). In response to receiving Message 4, the user equipment 10 completes the transmission of the acknowledgement information for Message4 to the base station 20 at time T5 (Step S711). Subsequently, the user equipment 10 stops the TA timer of the user equipment 10 at a start of the next random access procedure.

According to this method, the user equipment 10 always stops (or MAC resets) the TA timer of the user equipment 10 at each start of a random access procedure (or an RRC procedure, such as an RRC connection request or RC connection resume).

In the above-described method 1 and method 2, the TA timer of the user equipment 10 may be considered stopped or expired.

Furthermore, the user equipment 10 may report, to the base station 20, the UE capability related to a function to suspend stop of the TA timer of the user equipment 10. In addition, as a method of reporting the UE capability from the user equipment 10 to the base station 20, a maximum value of the time during which stop of the TA timer of the user equipment 10 can be suspended may be reported. For example, the capability of the user equipment 10 that is unable to suspend stop of the TA timer of the user equipment 10 may be reported as capability=0 ms.

(Device Configuration)

Next, an example of a functional configuration of the user equipment 10 and the base station 20 that execute the process operation described above is described. Each of the user equipment 10 and the base station 20 is provided with all of the functions described in the embodiments. However, each of the user equipment 10 and the base station 20 may include only a part of the functions described in the embodiments. The user equipment 10 and the base station 20 may be collectively referred to as a communication device.

<User Equipment>

Figure 11:
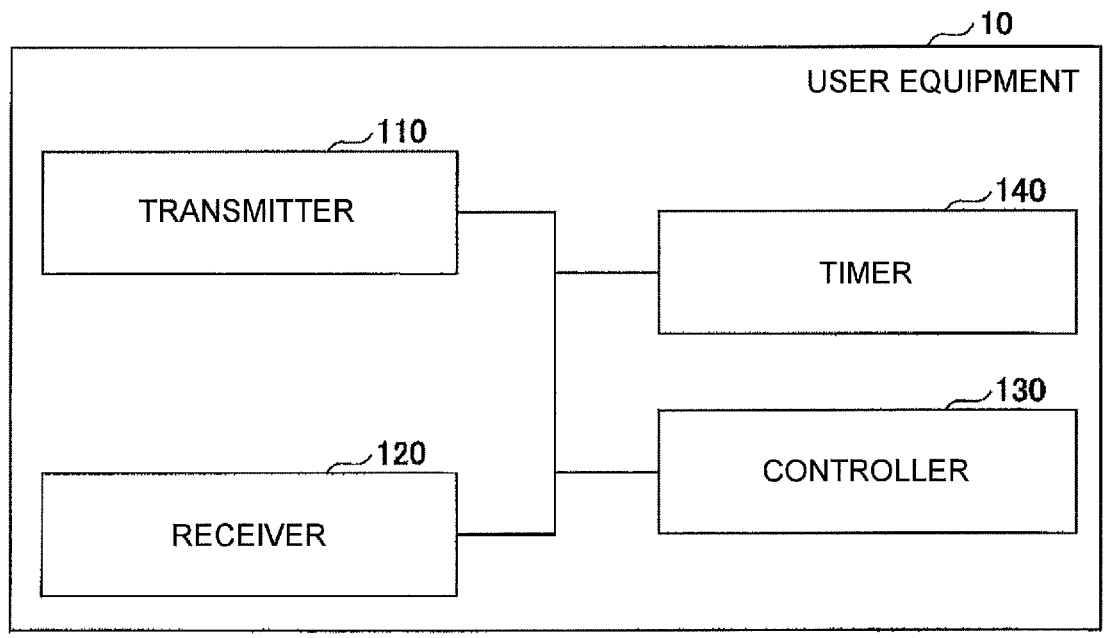
FIG. 11 is a diagram illustrating an example of a functional configuration of user equipment 10.

FIG. 11 is a diagram illustrating an example of a functional configuration of the user equipment 10. As illustrated in FIG. 11, the user equipment 10 includes a transmitter 110, a receiver 120, a controller 130, and a timer 140. The functional configuration shown in FIG. 10 is merely one example. If the operation according to the present embodiment can be executed, functional divisions and names of functional units may be any divisions and names.

The transmitter 110 generates a transmission signal from transmission data and wirelessly transmits the transmission signal. The receiver 120 wirelessly receives a various types of signals and retrieves a higher layer signal from the received physical layer signal. The receiver 120 includes a measuring unit that performs measurement of the received signal and obtains the received power, etc.

The controller 130 controls the user equipment 10. The function of the controller 130 related to the transmission may be included in the transmitter 110, and the function of the controller 130 related to the reception may be included in the receiver 120. The timer 140 is a timer utilized by the controller 130 to control the length of time that the user equipment 10 maintains the time alignment (Time Alignment) of the transmission timing of an uplink signal. The timer 140 operates (runs) after start, until stop, or until expire (expire), and otherwise does not operate. When the timer 140 is not running, the controller 130 may start the timer 140. When the timer 140 is running, the controller 130 may restart the timer 140. The timer 140 is always started or restarted from an initial value of the timer 140. The timer 140 may be implemented, for example, as a counter. However, the method of implementing the timer 140 is not particularly limited in this specification.

When a random access procedure is started in the user equipment 10, the transmitter 110 of the user equipment 10 selects a resource for transmitting a random access preamble and transmits the random access preamble to the base station 20 using the resource.

The receiver 120 receives a random access response transmitted from the base station 20 in response to receiving a random access preamble. In response to the receipt of the random access response by the receiver 120, the controller 130 starts the timer 140. In response to receiving random access response by the receiver 120, the controller 130 causes the transmitter 110 to transmit Message3 including an SI request to the base station 20.

The receiver 120 receives a content solution message transmitted from the base station 20 in response to receiving Message 3 including an SI request. In response to receiving a content solution message by the receiver 120, the controller 130 causes the transmitter 110 to transmit acknowledgement information, and then the controller 130 stops the timer 140. Alternatively, the controller 130 may cause the transmitter 110 to transmit the acknowledgement information, and thereafter, the timer 140 may be stopped at a start of a next random access procedure while the timer 140 is kept running.

<Base Station 20>

Figure 12:
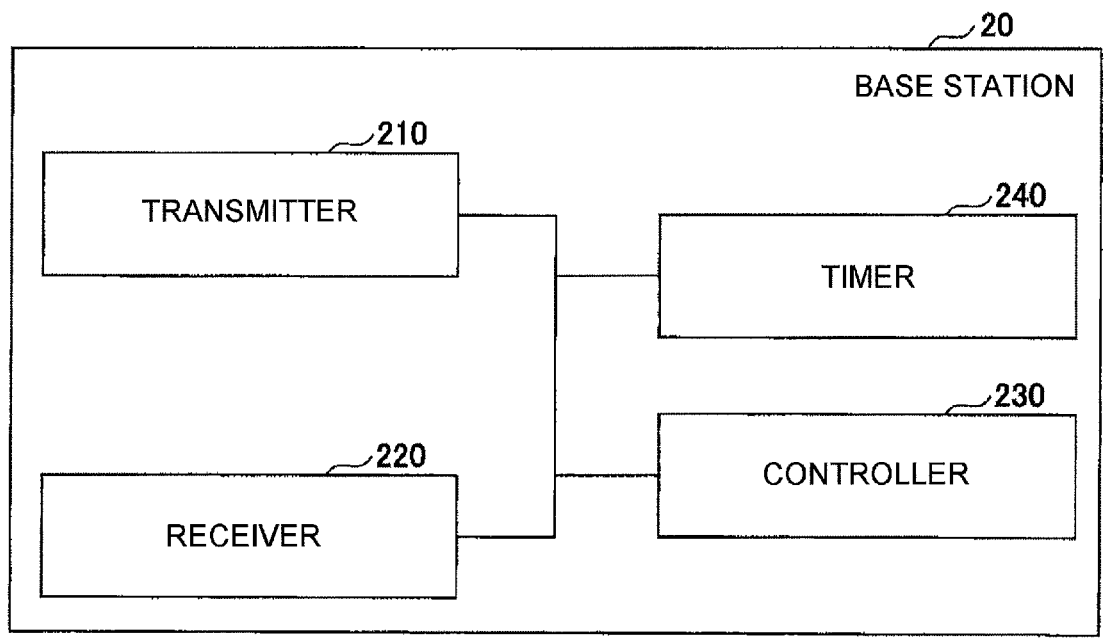
FIG. 12 is a diagram illustrating an example of a functional configuration of a base station 20.

FIG. 12 is a diagram illustrating an example of a functional configuration of the base station 20. As shown in FIG. 12, the base station 20 includes a transmitter 210, a receiver 220, a controller 230, and a timer 240. The functional configuration shown in FIG. 11 is merely an example. If the operation according to the present embodiment can be executed, functional divisions and names of functional units may be any divisions and names.

The transmitter 210 includes a function for generating a signal to be transmitted to the user equipment 10 and wirelessly transmitting the signal. The receiver 220 includes a function for receiving various signals transmitted from the user equipment 10 and retrieving information of a higher layer, for example, from the received signal. The receiver 220 includes a measuring unit that performs measurement of the received signal and obtains the received power, etc.

The controller 230 controls the base station 20. The function of the controller 230 related to the transmission may be included in the transmitter 210, and the function of the controller 230 related to the reception may be included in the receiver 220. The timer 240 is a timer utilized by the controller 230 to control the length of time that the base station 20 maintains the timing of transmission of uplink signals transmitted from the user equipment 10. The timer 240 operates (run) after start, until stop, or until expire (expire), and otherwise does not operate. When the timer 240 is not running, the controller 230 can start the timer 240. When the timer 240 is running, the controller 230 may restart the timer 240. The timer 240 is always started or restarted from the initial value of the timer 240. The timer 240 may be implemented, for example, as a counter, but the method of implementing the timer 140 is not particularly limited in this specification.

<Hardware Configuration>

The block diagrams (FIG. 11 to FIG. 12) used in the description of the above-described embodiments illustrate blocks in units of functions. These functional blocks (components) are implemented by any combination of hardware and/or software. Furthermore, the means for implementing each functional block is not particularly limited. That is, each functional block may be implemented by one device with a physical and/or logical combination of elements, or may be implemented by two or more devices while directly and/or indirectly (e.g., wired and/or wireless) connecting the two or more devices that are physically and/or logically separated.

Figure 13:
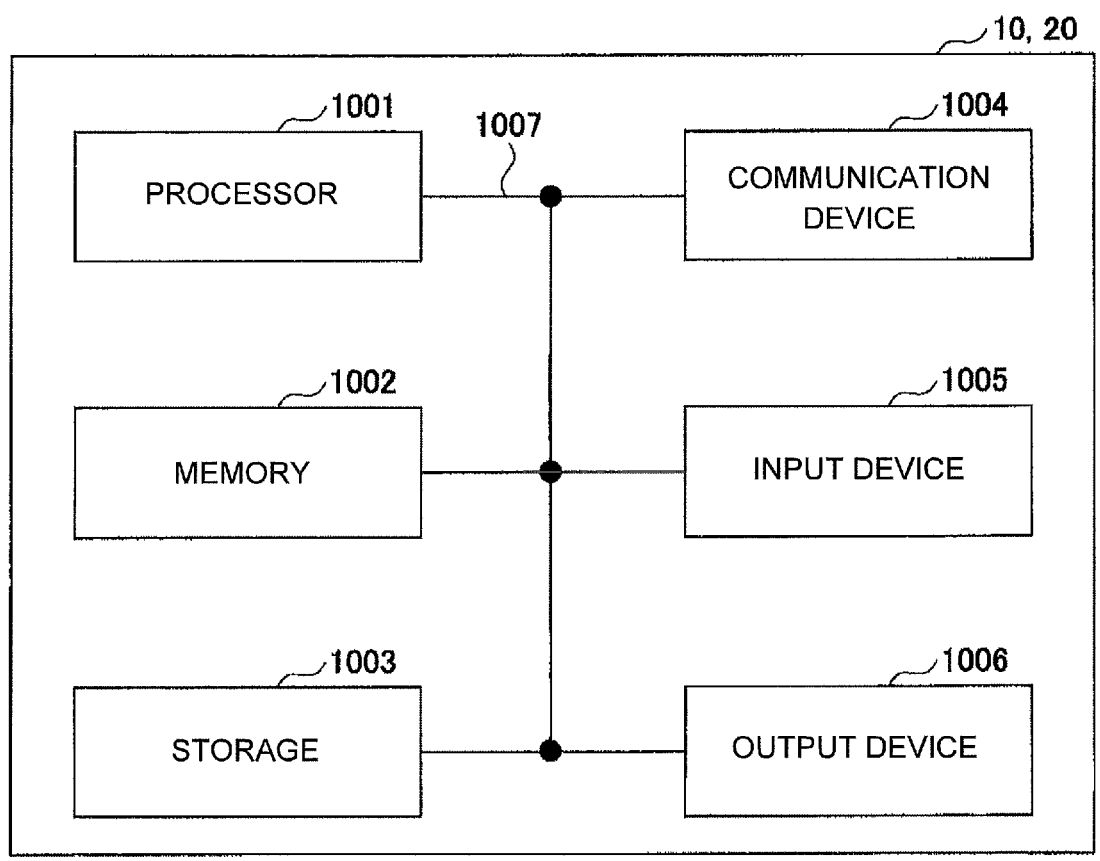
FIG. 13 is a diagram illustrating an example of a hardware configuration of each of the user equipment 10 and the base station 20.

For example, each of the user equipment 10 and the base station 20 according to one embodiment of the present invention may function as a computer performing the process according to this embodiments. FIG. 13 is a diagram illustrating an example of a hardware configuration of a user equipment 10 and a base station 20 according to the embodiment. Each of the above-described user equipment 10 and base station 20 may be physically configured as a computer device including a processor 1001, a memory 1002, a storage 1003, a communication device 1004, an input device 1005, an output device 1006, a bus 1007, etc.

In the following description, the term "device" can be read as a circuit, a device, a unit, etc. The hardware configuration of the user equipment 10 and base station 20 may be configured to include one or more of the devices denoted by 1001-1006 in the figure, or may be configured without some devices.

Each function of the user equipment 10 and the base station 20 is implemented by loading predetermined software (program) on hardware, such as the processor 1001 and the memory 1002, so that the processor 1001 performs computation and controls communication by the communication device 1004, and reading and/or writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module or data from the storage 1003 and/or the communication device 1004 to the memory 1002, and executes various processes according to these. As the program, a program is used which causes a computer to execute at least a part of the operations described in the above-described embodiment. For example, the transmitter 110, the receiver 120, the controller 130, and the timer 140 of the user equipment 10 illustrated in FIG. 11 may be implemented by a control program that is stored in the memory 1002 and operated by the processor 1001. For example, the transmitter 210, the receiver 220, the controller 230, and the timer 240 of the base station 20 illustrated in FIG. 12 may be implemented by a control program stored in the memory 1002 and operated by the processor 1001. While the various processes described above are described as being executed in one processor 1001, they may be executed simultaneously or sequentially by two or more processors 1001. Processor 1001 may be implemented by one or more chips. The program may be transmitted from the network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc. The memory 1002 may store a program (program code), a software module, etc., which can be executed for implementing the process according to one embodiment of the present invention.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including memory 1002 and/or storage 1003, a server, or any other suitable medium.

The communication device 1004 is hardware (transmitting and receiving device) for performing communication between computers through a wired and/or wireless network, and is also referred to, for example, as a network device, a network controller, a network card, a communication module, etc. For example, the transmitter 110 and the receiver 120 of the user equipment 10 may be implemented by the communication device 1004. The transmitter 210 and the receiver 220 of the base station 20 may be implemented by the communication device 1004.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

User equipment 10 and base station 20 may each include hardware, such as a microprocessor, a digital signal processor (DSP), an ASIC (Application Specific Integrated Circuit), a PLD (Programmable Logic Device), and a FPGA (Field Programmable Gate Array), which may implement some or all of each functional block. For example, processor 1001 may be implemented by at least one of these hardware components.

CONCLUSION OF THE EMBODIMENTS

As described above, according to the embodiments, there is provided user equipment including a transmitter that transmits a random access preamble to a base station; a receiver that receives a random access response transmitted from a base station; a controller that controls the user equipment; and a timer that operates in a time interval during which timing for transmitting an uplink signal from the user equipment is maintained, wherein, in response to receiving the random access response by the receiver, the controller activates the timer, and the controller causes the transmitter to transmit a message 3 including a message requesting transmission of system information to the base station, and wherein the controller stops the timer after a time period has elapsed from reception, by the receiver, of a contention resolution message transmitted from the base station. Here, "maintaining timing" may imply holding the timing, may imply controlling the timing, may imply adjusting the timing, or may imply setting the timing. According to the user equipment, a method of acquiring system information based on message 3 can be provided with which the user equipment can appropriately execute a random access procedure.

The time period may be any one of a time interval from the reception, by the receiver, of the contention resolution message transmitted from the base station in response to the receipt of the message 3 until the controller causes the transmitter to transmit acknowledgement information for the contention resolution message; a time interval from the reception, by the receiver, of the contention resolution message to a radio frame immediately after a radio frame at a timing at which the controller causes the transmitter to transmit the acknowledgement information for the contention resolution message; a time interval from the reception, by the receiver, of the contention resolution message to a subframe immediately after a subframe at the timing at which the controller causes the transmitter to transmit the acknowledgement information for the contention resolution message; a time interval from the reception, by the receiver, of the contention resolution message to a slot immediately after a slot at the timing at which the controller causes the transmitter to transmit the acknowledgement information for the contention resolution message; a time interval from the reception, by the receiver, of the contention resolution message to a symbol immediately after a symbol at the timing at which the controller causes the transmitter to transmit the acknowledgement information for the contention resolution message; and 4 ms. As a result, while securing a degree of freedom for the timing to stop the timer, the user equipment can be ensured to transmit the acknowledgement information for the contention resolution message.

The time period may be maintained by a Medium Access Control (MAC) layer or a Radio Resource Control (RRC) layer. According to this configuration, in addition to autonomously stopping the timer by the MAC upon expiration of the timer, setting of whether the timer is stopped or not stopped or an amount of delay of the timing to stop the timer can be modified depending on an RRC state of the user equipment (UE). Alternatively, the MAC layer may also apply a different operation or delay amount for each RRC state by implicitly determining, by the MAC layer, whether the SI request is an SI request of which the RRC state of the user equipment is an RRC CONNECTED state, or an SI request of which the RRC state of the user equipment is an RRC IDLE state or an RRC INACTIVE state. For example, if an SI request is transmitted by a CCCH SDU, the MAC layer may determine that the RRC state of the user equipment is the RRC IDLE state or the RRC INACTIVE state. If an SI request is transmitted on a Dedicated Control Channel (DCCH) (through a Signaling Radio Bear (SRB) for transmitting DCCH data), the RRC state of the user equipment may be determined to be the RRC CONNECTED state.

When the time period is maintained by the RRC layer, the RRC layer may modify setting of whether the timer is stopped, or the RRC layer may modify a delay amount of the timing to stop the timer, in accordance with the RRC state of the user equipment. As a result, if another RRC procedure is not started, the timer can be caused not to stop.

When the time period is maintained by the RRC layer, upon detecting that an RRC state of the user equipment is an RRC IDLE state or an RRC INACTIVE state, the controller may stop the timer after the time period has elapsed from the reception, by the receiver, of the contention resolution message, and, upon detecting that the RRC state of the user equipment is an RRC CONNECTED state, the controller may prevent the timer from being stopped. As a result, if another RRC procedure is not started, the timer can be caused not to stop.

The time period may be a timer interval from the reception, by the receiver, of the contention resolution message transmitted from the base station in response to the reception of the message 3 until a time to start a next RRC procedure. As a result, when a random access procedure is executed and, subsequently, a next random access procedure is executed, the user equipment can be caused to execute the random access procedures appropriately.

SUPPLEMENTAL EMBODIMENTS

While the embodiments of the present invention are described above, the disclosed invention is not limited to the embodiments, and those skilled in the art will appreciate various alterations, modifications, alternatives, substitutions, etc. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the user equipment 10 and the base station 20 are described using functional block diagrams, but such devices may be implemented in hardware, software, or a combination thereof. Software operated by a processor in accordance with embodiments of the present invention and software operated by a processor in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in this specification, and notification of information may be made by another method. For example, notification of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, broadcast information (MIB (Master Information Block), SIB (System Information Block))), or other signals or combinations thereof. RRC signaling may be referred to as an RRC message, for example, which may be an RRC connection setup message, an RRC connection reconfiguration (RRC Connection Connection Connection), etc.

The aspects/embodiments described in this specification may be applied to a system using LTE (Long Term Evolution), LTE-A (LTE-Advanced), SUPER 3G, IMT-Advanced, 4G, 5G, FRA (Future Radio Access), W-CDMA (Registered Trademark), GSM (Registered Trademark), CDMA2000, UMB (Ultra Mobile Broadband), IEEE 802.11 (Wi-Fi), IEEE 802.16 (WiMAX), IEEE 802.20, UWB (Ultra-Wide-Band), Bluetooth (Registered Trademark), or any other appropriate system, and/or a next generation system extended based on theses.

The processing procedures, sequences, flow charts, etc. of each aspect/embodiment described herein may be reordered, provided that there is no contradiction. For example, the methods described in this specification present elements of various steps in an exemplary order and are not limited to the particular order presented.

The particular operation described in this specification to be performed by base station 20 may be performed by an upper node in some cases. It is apparent that in a network consisting of one or more network nodes having base stations 20, various operations performed for communicating with user equipment 10 may be performed by base stations 20 and/or other network nodes other than base stations 20 (e.g., MME or S-GW can be considered, however, the network node is not limited to these). The case is exemplified above in which there is one network node other than the base station 20. However, the network node other than the base station 20 may be a combination of multiple other network nodes (e.g., MME and S-GW).

The aspects/embodiments described in this specification may be used alone, may be used in combination, or may be switched during execution.

The user equipment 10 may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be referred to by one of ordinary skill in the art as NB (NodeB), eNB (enhanced NodeB), base station (Base Station), gNB, or some other suitable terms.

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The phrase "based on" used in this specification does not imply "based solely on" unless otherwise specified. In other words, "based on" means both "based solely on" and "at least based on."

The terms "include (include)" "including (including)," and variants thereof are used in this specification or in the claims, these terms are intended to be inclusive, similar to the term "comprising." Furthermore, it is intended that the term "or" as used in this specification or in the claims is not an exclusive logical sum.

Throughout the present disclosure, if an article is added by translation, such as "a," "an", and "the" in English, these articles may include a plurality of things unless as otherwise indicated by the context clearly.

The present invention is described in detail above. It is apparent to those skilled in the art that the present invention is not limited to the embodiments described in this specification. The present invention can be implemented as modifications and alterations without departing from the gist and scope of the present invention as defined by the claims. Accordingly, the descriptions in this specification is intended for illustrative purposes and does not have any restrictive meaning to the present invention.

LIST OF REFERENCE SYMBOLS

10 user equipment
110 transmitter
120 receiver
130 controller
140 timer
20 base station
210 transmitter
220 receiver
230 controller
240 timer
1001 processor
1002 memory
1003 storage
1004 communication device
1005 input device
1006 output device

The invention claimed is:

1. A terminal comprising:
a receiver configured to receive a Timing Advance command; and
a controller configured to control a time Alignment (TA) timer related to uplink time alignment,
wherein the terminal performs a contention based random access procedure for a system information (SI) request,
wherein, in response to receiving the Timing Advance command by the receiver, the controller starts the TA timer,
wherein, upon receiving, by the receiver, a contention resolution message in the contention based random access procedure for the SI request, the controller stops the TA timer after completing transmission of acknowledgement information for the contention resolution message in the contention based random access procedure for the SI request, and
wherein the controller is configured to keep the TA timer running in a time interval from a timing at which the receiver receives the contention resolution message to a timing at which the transmission of the acknowledgement information is completed.

2. The terminal according to claim 1, wherein the TA timer is maintained by a Medium Access Control (MAC) layer.

3. A communication method by a terminal, the method comprising:
receiving a Timing Advance command; and
controlling a time Alignment (TA) timer related to uplink time alignment,
wherein the terminal performs a contention based random access procedure for a system information (SI) request,
wherein, in response to receiving the Timing Advance command, the controlling starts the TA timer,
wherein, upon receiving a contention resolution message in the contention based random access procedure for the SI request, the controlling stops the TA timer after completing transmission of acknowledgement information for the contention resolution message in the contention based random access procedure for the SI request, and wherein the controlling keeps the TA timer running in a time interval from a timing at which the contention resolution message is received to a timing at which the transmission of the acknowledgement information is completed.

* * * * *